No. 761,441. PATENTED MAY 31, 1904.
J. C. BROOKS.
CORN STALK PULVERIZER.
APPLICATION FILED SEPT. 8, 1903.
NO MODEL. 2 SHEETS—SHEET 2.

WITNESSES
Jas. B. Clarke
M. M. Morris

INVENTOR
J. C. Brooks
by E. H. Bates, Attorney

No. 761,441. Patented May 31, 1904.

UNITED STATES PATENT OFFICE.

JOHN C. BROOKS, OF CHARLESTON, ILLINOIS.

CORNSTALK-PULVERIZER.

SPECIFICATION forming part of Letters Patent No. 761,441, dated May 31, 1904.

Application filed September 8, 1903. Serial No. 172,255. (No model.)

*To all whom it may concern:*

Be it known that I, JOHN C. BROOKS, a citizen of the United States, residing at Charleston, in the county of Coles and State of Illinois, have invented new and useful Improvements in Cornstalk-Pulverizers, of which the following is a specification.

This invention has relation to improvements in devices for crushing or pulverizing cornstalks, the same being used or operated in the field upon the growing or standing stalks; and it consists in the novel construction, combination, and arrangement of parts of which it is composed, all as will be hereinafter more fully explained, and particularly pointed out in the appended claim.

The annexed drawings, to which reference is made, fully illustrate my invention, in which—

Figure 1:
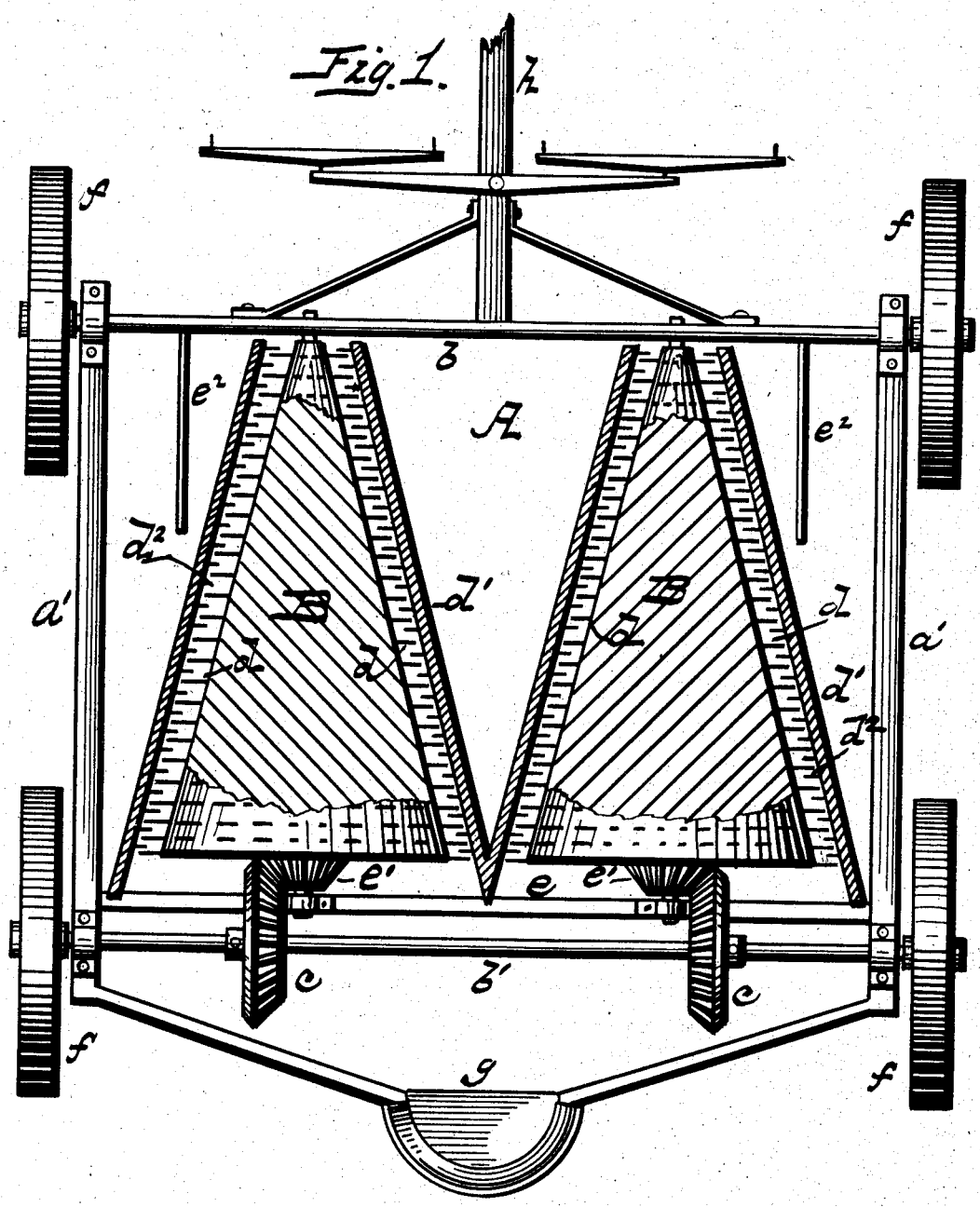
Figure 2:
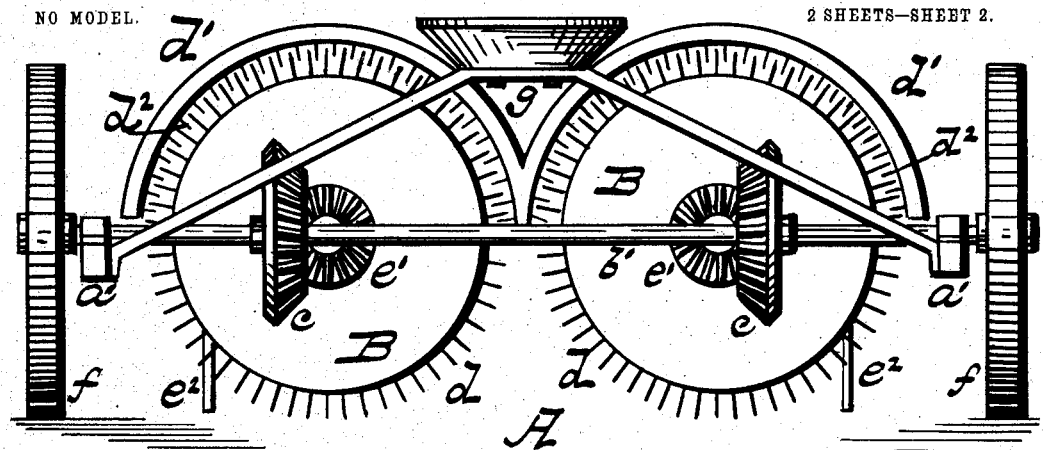
Figure 3:
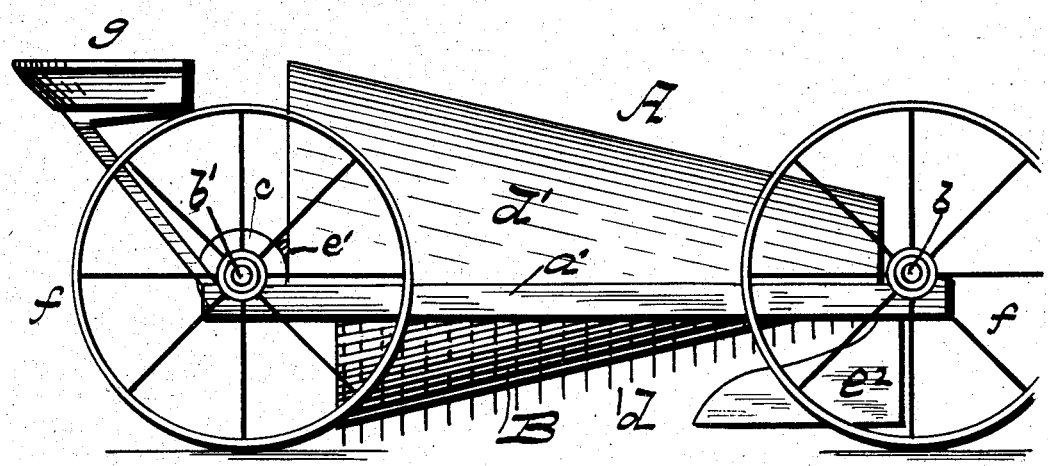

Figure 1 represents a top or plan view of my cornstalk-pulverizer, partly in section. Fig. 2 is a rear view of the same, and Fig. 3 is a side view.

Referring by letter to the accompanying drawings, A designates the cornstalk-pulverizer, comprising the frame composed of the parallel side bars $a'$ $a'$ and front and rear axles $b$ $b'$, which latter are provided with a pair of beveled gear-wheels $c c$, keyed thereon, adapted to engage beveled pinions, further hereinafter explained.

B B represent twin cone-shaped revolving bodies, each having upon its surface teeth $d$, and the same are arranged within a cover $d'$, having similar teeth $d^2$ to those upon the cones except that those on the inside of the cover are somewhat shorter in length than the coneteeth. These cones have their front and rear bearing in the front axle and rear cross-bar $e$, that connects the rear ends of the side bars. Each of said cones is provided with a pinion $e'$ $e'$ that engage a beveled gear-wheel on the rear axle.

To the forward end of the frame of the machine is secured a pair of runners $e^2$ $e^3$, designed to separate the stalks as the machine advances, thus guiding the standing stalks into the machine to be pulverized. $f$ designates the transport-wheels of the machine, $g$ the driver's seat, and $h$ is the draft-tongue.

It will be seen that in operation as the machine advances upon the standing cornstalks said stalks enter the inclosing cover at same time the cones are revolving through the medium of the pinions and gear-wheels and are ground or pulverized by the teeth of the cones and cover, after which they are dropped upon the soil for fertilizing purposes.

I do not wish to confine myself to the exact construction of my improved cornstalk-pulverizer, as various changes can be made in its construction without departing from the spirit of my invention.

Having thus described my invention, what I claim as new, and desire to secure by Letters Patent, is—

The within-described cornstalk-pulverizer comprising the frame mounted upon the transporting-wheels, the cones pivoted in said frame and provided with teeth, the cover provided on its inner face with teeth; the runner secured to the forward end of the frame and the pinions and beveled gear-wheels, the whole adapted to operate as and for the purpose set forth.

In testimony whereof I have signed my name to this specification in the presence of two subscribing witnesses.

JOHN C. BROOKS.

Witnesses:
JOHN FAVORITE,
A. F. C. CHARLESWORTH.